(12) United States Patent
Azevedo (10) Patent No.: US 10,127,834 B2
(45) Date of Patent: Nov. 13, 2018

(54) MEASUREMENT RING FOR A MANNEQUIN AND SIMULATOR INTERACTING THEREWITH

(71) Applicant: CAE HEALTHCARE CANADA INC., Saint-Laurent (CA)

(72) Inventor: Hugo Azevedo, Dollard-des-Ormeaux (CA)

(73) Assignee: CAE HEALTHCARE CANADA INC., Saint-Laurent (CA)

( * ) Notice: Subject to any disclaimer, the term of this patent is extended or adjusted under 35 U.S.C. 154(b) by 0 days.

(21) Appl. No.: 14/674,060

(22) Filed: Mar. 31, 2015

(65) Prior Publication Data

US 2016/0293053 A1     Oct. 6, 2016

(51) Int. Cl.
*G09B 23/28*     (2006.01)
*G09B 23/34*     (2006.01)

(52) U.S. Cl.
CPC ............. *G09B 23/28* (2013.01); *G09B 23/34* (2013.01); *G09B 23/285* (2013.01)

(58) Field of Classification Search
USPC .................. 434/262, 267, 272; 600/114, 117
See application file for complete search history.

(56) References Cited

U.S. PATENT DOCUMENTS

| | | | |
|---|---|---|---|
| 8,663,106 B2 | 3/2014 | Stivoric et al. | |
| 9,204,806 B2 | 12/2015 | Stivoric et al. | |
| 2001/0016804 A1* | 8/2001 | Cunningham | G09B 23/285 703/7 |
| 2002/0162555 A1* | 11/2002 | West | A61B 1/00154 128/206.29 |
| 2003/0208103 A1* | 11/2003 | Sonnenschein | A61B 1/00154 600/117 |
| 2004/0034302 A1 | 2/2004 | Abovitz et al. | |
| 2006/0063973 A1 | 3/2006 | Makower et al. | |
| 2009/0048577 A1 | 2/2009 | Gillies et al. | |
| 2012/0095297 A1* | 4/2012 | Dang | A61B 17/0218 600/208 |
| 2012/0298119 A1* | 11/2012 | Reese | E05B 75/00 128/875 |
| 2014/0094649 A1* | 4/2014 | Ito | A61B 1/00154 600/103 |
| 2014/0349267 A1* | 11/2014 | Thornton | G09B 23/02 434/276 |

FOREIGN PATENT DOCUMENTS

| | | |
|---|---|---|
| CA | 2820529 A1 | 5/2014 |
| EP | 2997904 A2 | 3/2016 |

* cited by examiner

*Primary Examiner* — James Hull
(74) *Attorney, Agent, or Firm* — Fasken Martineau DuMoulin LLP (57) ABSTRACT

The present disclosure relates to a measurement ring for positioning at an orifice of a mannequin or standardized patient. The measurement ring comprises a hollow channel, an annular lip, at least one sensor and a communication module. The annular lip is located at a first extremity of the hollow channel and forms therewith an insertion channel for inserting at least one instrument in the orifice of the mannequin or standardized patient. The at least one sensor measures at least one parameter related to insertion of the instrument in the insertion channel and generates insertion data. The communication module transmits the insertion data to a simulation system.

13 Claims, 6 Drawing Sheets

MEASUREMENT RING FOR A MANNEQUIN AND SIMULATOR INTERACTING THEREWITH

TECHNICAL FIELD

The present disclosure relates to the field of medical procedures simulation. More specifically, the present disclosure relates to a measurement ring to be used with a mannequin when simulating medical procedures.

BACKGROUND

Before performing medical procedures, medical professionals require training. In the past, the training was performed on patients under the supervision of experienced medical professionals. However, training on patients is risky as inadequate or inappropriate movements or procedures may cause serious damages. To overcome these problems, some hospitals and medicine schools are gradually offering training on mannequin simulators. Mannequin simulators mimic anatomical characteristics of patients, and are used to simulate medical procedures.

To enhance and improve simulated medical procedures, it is necessary to obtain measurements and data of undergoing procedures, so as to have complete information for creating realistic and detailed simulations. To date, there is very limited information and measurements obtained from medical procedures including inserting probes or surgical equipment through an orifice of the patient. There is therefore a need for a new device to measure parameters of undergoing medical procedures performed through an orifice of a patient or mannequin.

SUMMARY

In accordance with a first aspect, the present specification relates to a measurement ring for positioning at an orifice of a mannequin. The measurement ring comprising a hollow channel, an annular lip, at least one sensor, a communication module. The annular lip is positioned at a first extremity of the hollow channel. The annular lip and hollow channel form an insertion channel for inserting at least one instrument in the orifice of the mannequin. The at least one sensor is adapted for measuring at least one parameter related to insertion of the instrument in the insertion channel and generate insertion data therefor. The communication module is adapted for transmitting the insertion data to a simulation data collection unit.

In a particular aspect, the present specification relates to a simulation system for simulating medical procedure and collecting simulation data. The simulation system comprises the present measurement ring positioned at an orifice of a mannequin. The simulation system further comprises a data collection unit for collecting the insertion data generated and communicated by the measurement ring.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to measuring parameters related to insertion of instrument(s) (for example endoscope, colonoscope, bronchoscope, etc.) in an orifice of a patient or mannequin. Throughout the present description, the expression instrument(s) will be used to describe one or several instruments being inserted concurrently through an orifice of a patient or mannequin for performing a medical procedure. In a particular aspect, the instrument(s) could be expendible and/or collapsible and/or telecopic.

The present description relates to a measurement ring, and its use in the field of patient simulators, standardized patients and/or patients. The present measurement ring can be used to train medical professionals in performing procedures in which instrument(s) must be inserted through an orifice, such as for example the mouth, the nose, ears, or the anus. Furthermore, the present measurement ring can be used during procedures to measure insertion parameters related to the insertion of instrument(s) into the orifice, and compare the measured insertion parameters with ranges of acceptable measurements. The present measurement ring can also be used with a patient simulator or a standardized patient, so as to collect insertion data and generate therefor simulation results.

Figure 1:
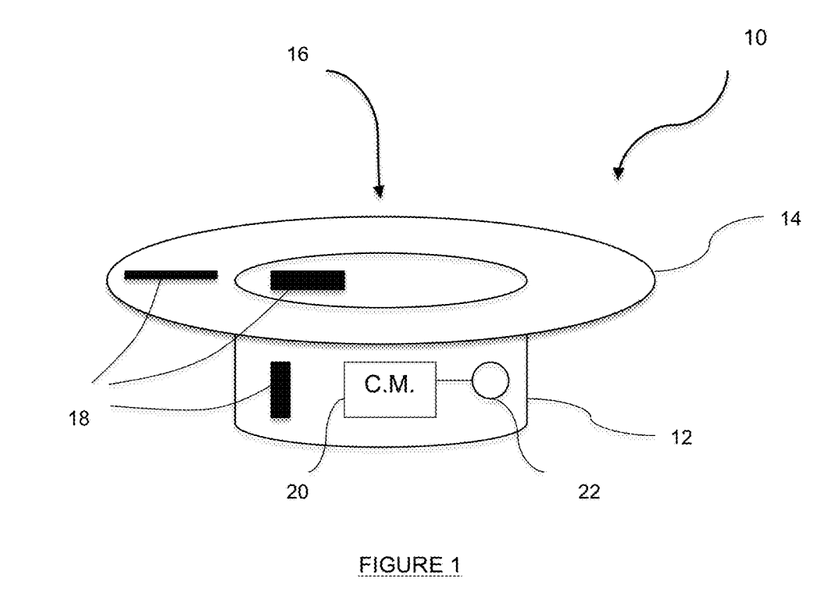
FIG. 1 is a perspective view of the present measurement ring.
Figure 2:
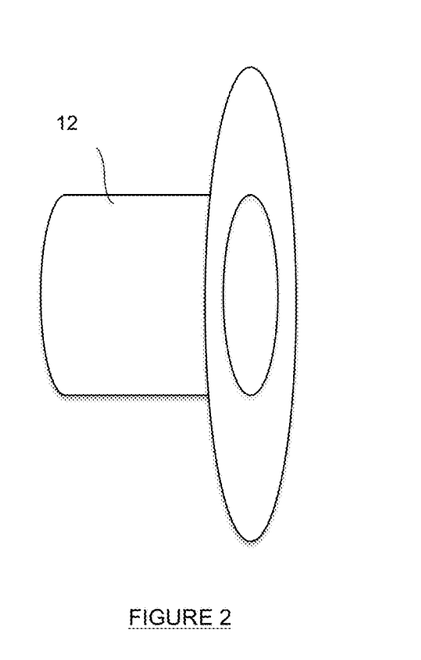
FIG. 2 is a side perspective view of the present measurement ring.

Referring now concurrently to FIGS. 1 and 2, there is shown a perspective view and a side elevation view of the present measurement ring 10. The measurement ring 10 comprises a hollow channel 12 and an annular lip 14 at an extremity of the hollow channel 12. The annular lip 14 and the hollow channel 12 define an insertion channel 16 for instrument(s) during a medical procedure. The hollow channel 12 is shaped, sized and proportioned for smooth and comfortable insertion into an orifice of a patient, standardized patient or mannequin. Hence, depending on the application, the hollow channel will be sized smaller for use in the nose and ears, and larger and longer for use in the mouth. The hollow channel 12 can be cylindrical, cone-shaped with a truncated end, etc. The hollow channel 12 may be made of a solid material or a semi rigid material. Soft materials could also be used to manufacture the hollow channel 12 for applications in which the hollow channel 12 is flexible upon its length to allow smooth insertion into the orifice while the instrument(s) is inserted there through.

The annular lip 14 is shaped, sized and proportioned so as to comfortably remain outside of the body, while allowing the hollow channel 12 to be inserted into an orifice of the patient or the mannequin. For example, if the measurement ring 10 is designed for insertion in the mouth of a patient, the annular lip 14 would be shaped and sized so as to cover the lips and teeth of a patient, while the hollow channel 12 would be sized to allow comfortable insertion into the mouth of the patient.

Although shown as en ellipse on FIG. 1, the annular lip could have different shapes and sizes. For example, the annular lip 14 can be symmetrical, asymmetrical, evenly shaped along its internal and/or external circumference, unevenly shaped along its internal and/or external circumference, thinner, thicker, flexible, or solid. The hollow channel 12 and the annular lip 14 may be made as two distinct pieces joined together to form the insertion channel 16, or they could be made as one piece for example by using a mold or 3D printing technology. The measurement ring may be shaped as a mouth block or a bite block. The hollow channel 12 and the annular lip 14 are made of medical grade material, such as for example silicone. With the advance of 3D printing technology, it could also be possible to print in 3D in a material appropriate for use in medical application, a custom-sized hollow channel 12 and annular lip 14 so as to offer maximum comfort when used with a patient.

The measurement ring 10 further comprises one or several sensors 18. The following description will use the term sensor(s) 18 to concurrently refer to one or several sensors. The sensor(s) 18 is/are positioned on the measurement ring 10 so as to measure any of the following parameters taken solely or in combination: insertion of instrument(s) in the insertion channel 16, movement of the instrument(s) in the insertion channel 16, position and/or pressure applied by the instrument(s) against the hollow channel 12, speed of insertion of the instrument(s) in the insertion channel 16, pressure of the instrument(s) on the interior of the hollow channel 12 or portion thereof, and pressure of the instrument(s) on the annular lip 14 or portion thereof. Depending on the application for which the measurement ring 10 is manufactured, various types of instrument(s) could be inserted within the insertion channel 16. For example, when the measurement ring 10 is sized and shaped to be used in the mouth of a patient or mannequin, the insertion channel 16 would be sufficiently large to allow insertion of ((s) used for medical procedures such for example as intubation and endoscopy.

The sensor(s) 18 may be positioned inside or outside of the measurement ring 10, or within the material of the measurement ring itself. Furthermore, the sensor(s) 18 may be positioned along a portion of the hollow channel 12 and/or along the annular lip 14. Additionally, the sensor(s) 18 may be located along an interior and/or exterior periphery of the hollow channel 12 or annular lip 14, or along a portion of the length of the hollow channel 12 and/or of the annular lip 14. The sensor(s) 18 may be positioned concurrently on the hollow channel 12 and the annular lip 14. Examples of positioning of the sensor(s) 18 are shown on FIG. 1 for exemplary purposes only. The sensor(s) 18 are positioned so as to allow measurement of insertion parameters of an instrument (not shown) through the insertion channel 16 of the measurement ring 10 and generate corresponding insertion data.

The sensor(s) 18 may consist of any of the following types of sensors, taken singly or in combination: pressure sensor(s), position sensor(s), movement sensor(s), tensile sensor(s) and distance sensor(s). The sensor(s) 18 measure(s) parameter(s) related to the insertion of one or several instruments in the insertion channel 16 independently of the instrument(s) being inserted, i.e. without requiring any modification to the instrument(s) currently used.

In the event that the sensor(s) 18 is/are pressure sensor(s), the insertion data comprises pressure applied by the instrument(s) on the sensor(s) 18. When the sensor(s) 18 is/are position sensor(s), the insertion data comprises a position and/or an angle and/or rotation and/or depth and/or proximity of the instrument(s) being inserted within the insertion channel 16 of the measurement ring 10 or where/how the position sensor(s) is/are located precisely. When the sensor(s) 18 is/are movement sensor(s), the insertion data generated corresponds to movement of the instrument(s) in the insertion channel 16 or on the measurement ring 10. When the sensor(s) 18 is/are tensile sensor(s), the insertion data generated corresponds to the tensile movement of the material of the measurement ring 10 caused by the insertion of the instrument(s), measured along the measurement ring 10. When the sensor(s) 18 is/are distance sensor(s), the insertion data generated corresponds to a distance of the instrument(s) being inserted with respect to the distance sensor.

By using one or a plurality of sensor(s) 18 on the measurement ring 10, it is possible to measure various parameters quantifying and qualifying how the insertion of instrument(s) is performed by a medical professional either in training (on a mannequin or a standardized patient), or during an actual procedure (on a patient). The sensor(s) 18 may all be functioning concurrently, in series, in a predetermined sequence, in a random sequence or on demand. For example, the sensor(s) 18 may continuously take measurements but only start generating insertion data once a predetermined threshold measurement value is reached.

The measurement ring 10 further comprises a communication module 20. The communication module 20 receives the insertion data generated by the sensor(s) 18, and generates therefor measurement signal(s). The measurement signal comprises the insertion data generated by the sensor(s), with an identification of the corresponding sensor. The communication module 20 thus comprises a processor and a memory (not shown for clarity purposes). The communication module 20 may generate a measurement signal corresponding to any standard or proprietary protocol, such as for example WiFi, Bluetooth, or any other appropriate communication protocol. The communication module 20 further comprises an antenna and a transceiver (not shown for clarity purposes) for transmitting the measurement signal. Although shown on the Figures as positioned on the hollow channel 12 of the measurement ring 10, the communication module 20 could conversely be located on the annular lip 14. Additionally, the measurement ring 10 could comprise two communication modules 20, one communication module 20 on the hollow channel 12 for communicating the insertion data generated by the sensor(s) 18 located on the hollow channel 12, and another communication module 20 on the annular lip 14 for communicating the insertion data generated by the sensor(s) 18 located on the annular lip 14. In another alternative, there could be one communication module 18 per sensor 18, co-located therewith.

The communication module 20 may further receive command signals from a separate entity such as a patient simulator, a simulation system and/or a training platform, etc. The command signals comprises an identification of the sensor(s) from which a measurement is requested.

The measurement ring 10 further comprises a power source 22, such as for example a battery or a power cord plugged into an electric outlet or another electronic device (not shown). Alternatively, the power source 22 could consist of electrical contacts between the measurement ring 10 and a mannequin to power the measurement ring 10. The power source 22 powers the sensor(s) 18 and the communication module 20. Electrical connections between the power source 22 and the sensor(s) 18 and the communication module 20 are embedded within the material of the measurement ring 10 so as to avoid any electric shock with the instrument(s) inserted within the insertion channel 16, the patient and the medical professional. The electric connections are not shown on the Figures for clarity purposes, but any type of material and technique known in the field of medical devices and implants could be used to electrically connect the power source 22 to the sensor(s) 18 and communication module 20.

In a particular aspect, the hollow channel 12 may be closed at an end opposite the annular lip 14. Using a closed hollow channel 12 is particularly interesting when the measurement ring 10 is to be used with extendable/contractible instrument(s) such as collapsible instrument(s), retractable instrument(s), telescopic instrument(s), etc., as such instrument(s) may contract at the closed end of the hollow channel 12 and be handled at various angles, and thus provide additional types of measurements when the extendable/contractible instrument(s) either contracts on the closed end of the hollow channel 12 or expands therefrom.

Figure 3:
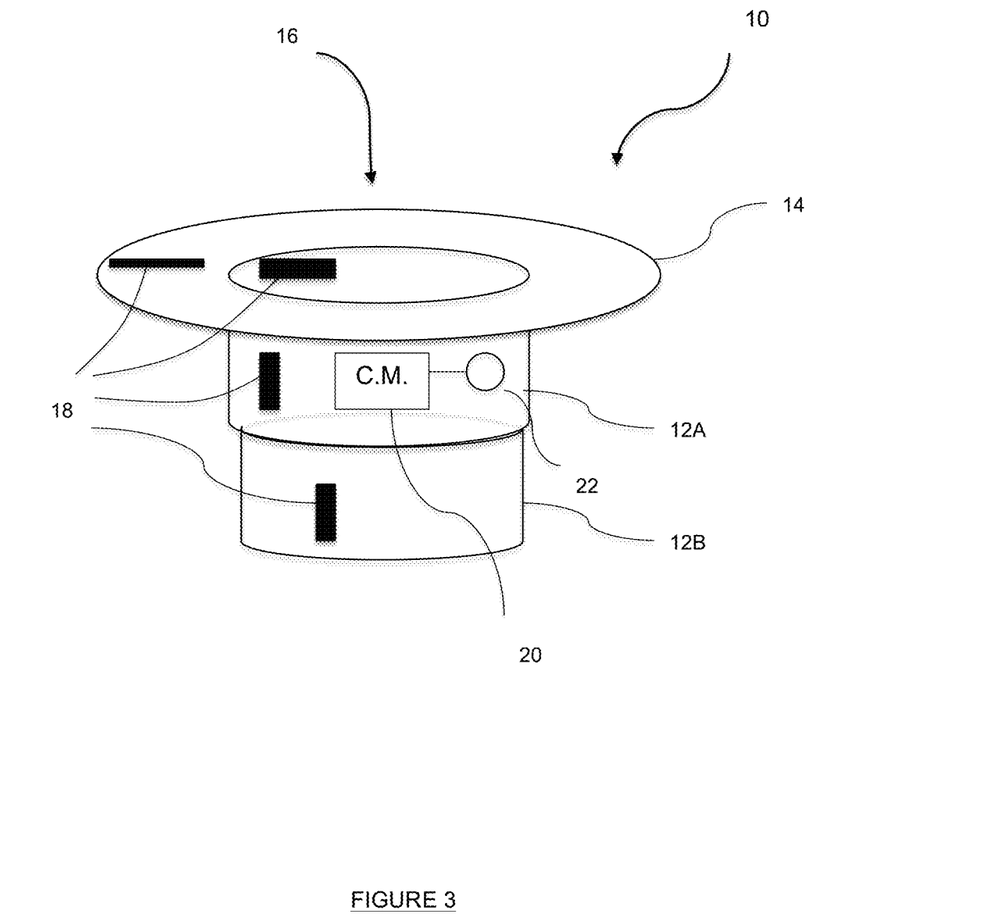
FIG. 3 is perspective view of an alternative of the present measurement ring.

In another particular aspect shown on FIG. 3, the hollow channel 12 of the measurement ring 10 is composed of a series of telescopic hollow channel segments 12A and 12B. The hollow channel segments 12A and 12B are connected at an end of the first telescopic hollow channel 12A opposite the annular lip 14. Although only two telescopic hollow channel segments 12A and 12B are shown on FIG. 3, the present measurement ring 10 could accommodate a much greater number of telescopic hollow channel segments. As shown on FIG. 3, the sensor(s) 18 could be positioned on the annular lip 14 and/or on one or several hollow channel segments 12A and 12B. The sensor(s) 18 on the telescopic hollow channel segments 12A and 12B is positioned on the hollow channel in such a manner as it does not prevent expansion or retraction of the hollow channel segments 12A and 12B. When inserted into an orifice of a patient, standardized patient or mannequin, the measurement ring 10 of FIG. 3 could be inserted with the hollow channel segments 12A and 12B grouped together, and upon insertion of instrument(s) within the insertion channel 16, the hollow channel segment 12B could separate from the hollow channel segment 12A into the expanded position. The interior periphery of the hollow channel segment 12B could be narrower than the interior periphery of the hollow channel segment 12A, so as to provide grip along the instrument(s) inserted into its expanded position, as shown on FIG. 3.

Figure 4A:
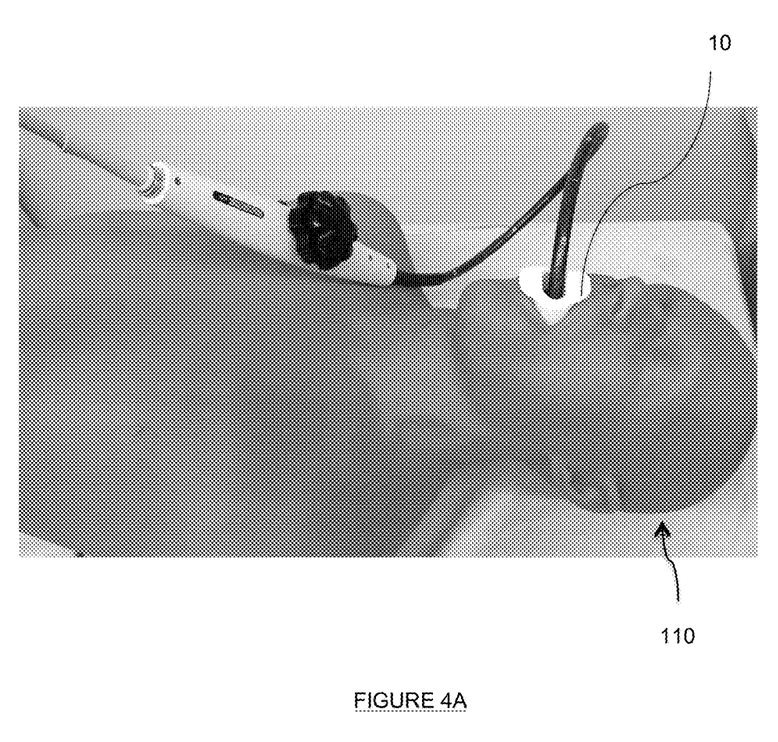
FIGS. 4A-4C are photographs of the present measurement ring inserted into the mouth of a mannequin, with an endoscope inserted therein.
Figure 4B:
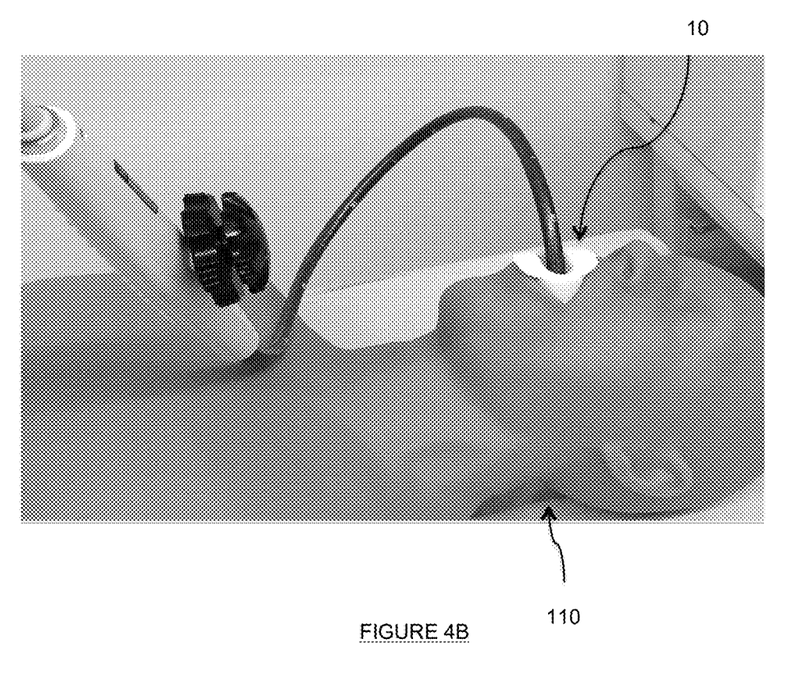
Figure 4C:
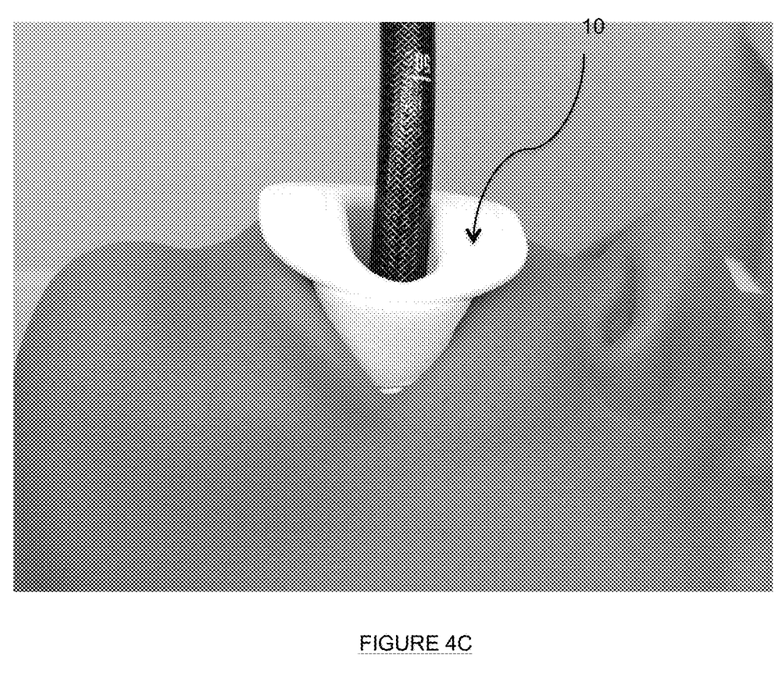

Reference is now made to FIGS. 4A-4C, which are photographs of the present measurement ring 10 inserted in the mouth of a mannequin 110. As can be appreciated, the annular lip of the measurement ring does not enter the body cavity, and only the hollow channel, or a section thereof, is inserted within the body cavity. In FIGS. 4A-4C, the instrument inserted within the insertion channel 16 of the measurement ring 10 is an endoscope, but any other instrument or plurality of instruments required for performing a medical procedure through the mouth could be inserted within the insertion channel of the measurement ring.

Figure 5:
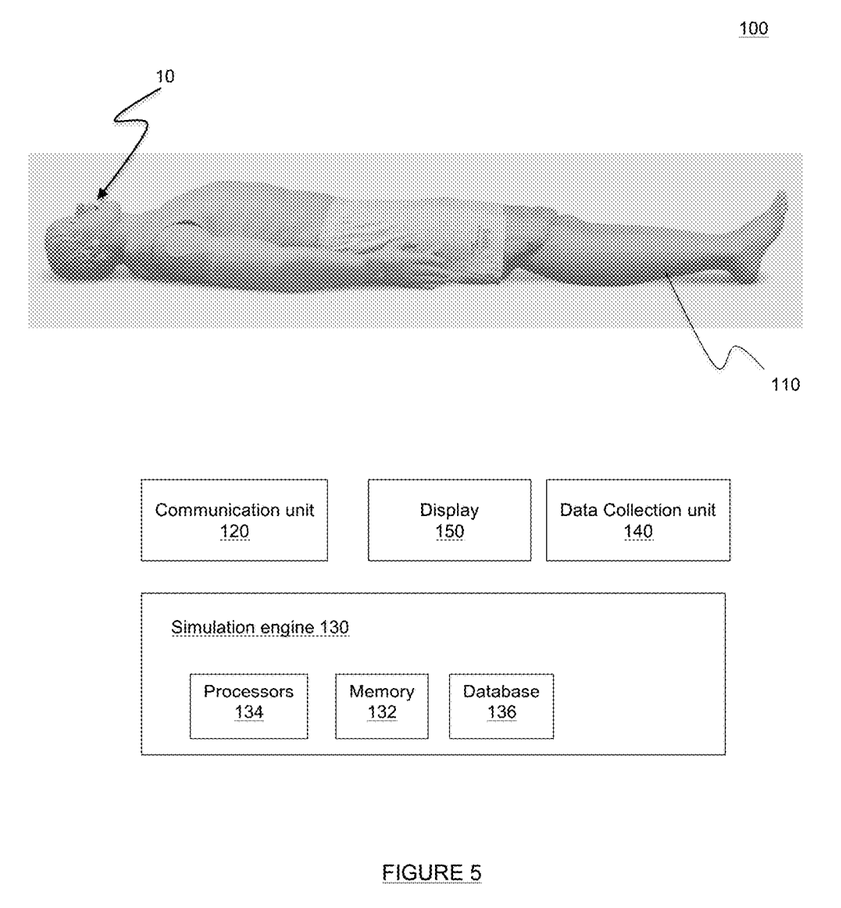
FIG. 5 is a schematic diagram of the simulation system.

Reference is now made concurrently to FIGS. 1 to 5, where FIG. 5 is a schematic functional diagram of the simulation system 100. The simulation system 100 comprises the measurement ring 10, to be inserted into an orifice (on FIG. 5 the mouth) of a mannequin 110 or a standardized patient (not shown). As the measurement ring 10 is very small in comparison to the mannequin 110, the positioning of the measurement ring 10 in the mouth of the mannequin is shown, but not the measurement ring 10 inside the mouth of the mannequin 110. As previously discussed, the measurement ring 10 could be used on any orifice of the mannequin 110, but the following description will refer to the mouth of the mannequin for simplicity purposes.

The simulation system 100 further comprises a communication unit 120 for wirelessly communicating with the communication module 20 of the measurement ring 10. The communication unit 120 of the simulation system and the communication module 20 of the measurement ring 10 may wirelessly communicate on an ongoing basis, on a per demand basis, or when a predetermined value measured by one of the sensor(s) of the measurement ring 10 is reached. The communication unit 120 of the simulation system 100 and the communication module 20 of the measurement ring 10 communicate any known protocol, either standard or proprietary.

Alternatively, the communication unit 120 of the simulation system 100 and the communication module 20 of the measurement ring 10 may be adapted to communicate via a physical connection using any known protocol, either standard or proprietary.

The communication unit 120 of the simulation system 100 is connected to a simulation engine 130. The simulation engine 130 comprises instructions stored in memory 132 to be executed by one or several processors 134. The memory 132 may consist of RAM, ROM, FlashDrive, memory banks, or any other type of memory either alone or in combination known in the industry. The instructions stored in the memory 132 may have been coded and compiled using any type or programming software known in the art, so as to produce an executable set of instructions stored in memory 132.

The executable set of instructions stored in memory 132 is executed by the processors 134. The processors may consist of a single processor or multiple processors either in series and/or parallel. The executable set of instructions, when executed, generates a simulation and the interactions of the simulation with the measurement ring 10 through the communication unit 120 of the simulation system 100 and the communication module 20 of the measurement ring 10. The processors 134 further retrieve and store simulation related data in a database 136. The simulation related data comprises both the data required to generate a simulation, but also the data collected during the simulation. The data collected is received by the data collection unit 140 from the communication module 20 of the measurement ring 10. The data collection unit 140 extracts the insertion data communicated by the communication module 20 of the measurement ring 10 and provides the insertion data to the processors 134. The processors 134 use the insertion data in the execution of the instructions so as to incorporate the insertion data in the simulation and modify/alter/adapt the simulation accordingly. The processors 134 further store the insertion data in the database 136 for future reference such as when evaluating performance of a medical professional during a simulated procedure or debriefing with the medical professional after or during the simulated procedure.

The communication unit 120, the simulation engine 130 and the data collection unit 140 can be remotely located from the mannequin or be all included or partially included in the mannequin 110 or in the vicinity thereof.

The simulation system 100 further comprises a display 150 for displaying at least one of the following: the insertion data received from the communication module 20 of the measurement ring 10, the position/angle/rotation of the instrument(s) in the insertion channel 16 of the measurement ring 10, progression of the insertion of the instrument(s) in the insertion channel 16, pressure of the instrument(s) against the annular lip 14, pressure of the instrument(s) along the interior periphery of the hollow channel 12, relative pressure of the instrument(s) along the insertion channel 16, the position of the instrument(s) along the insertion channel 16, acceptable measurements for any of the previously mentioned measurement and positions. The processors 134 may further provide guidelines or information for improving the performance of the medical professional during the medical procedure on the display.

The display 150 may further provide an image of an anatomical area. The image of the anatomical area may consist of a simulated ultrasound representation, an augmented reality image, or a photograph of the anatomical area corresponding with the position of the instrument(s) inserted through the insertion channel 16 based on the measurements of the sensor(s) 18 and simulated progression of the insertion of the instrument(s). The display 150 could alternately or concurrently display an image of the anatomical area where the instrument(s) would be positioned based on the measurements taken by the sensor(s) 18.

During simulation of a medical procedure using the present measurement ring 10, the simulation engine 130 may provide instructions to be followed by the medical professional on the display, rate the performance of the medical professional while executing the medical procedure based on the insertion data received from the measurement ring 10, identify to the medical professional during execution of the simulated procedure that some predetermined measurement thresholds have been reached and require changes or correction to the procedure being performed by the medical professional, etc.

By using the present measurement ring 10 while simulating a medical procedure with the simulation system 100, it is thus possible to identify potential problems which may arise during a real medical procedure, identify the improvements a medical professional must perform when inserting medical instruments in an orifice of a patient, set some standards of good practice for medical procedures including inserting at least one instrument in an orifice of a patient. Other advantages of the present measurement ring 10 used with the simulation system 100 will become apparent for those skilled in the art of medical procedures simulation.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A simulation system for simulating a medical procedure and collecting insertion data, the simulation system comprising: a measurement ring positioned at an orifice of one of a mannequin or a standardized patient, the measurement ring comprising: a hollow channel, the hollow channel comprising at least two telescopic hollow channel segments; an annular lip at a first extremity of the hollow channel, the annular lip and hollow channel forming an insertion channel for inserting at least one instrument, the at least two telescopic hollow channel segments being collapsible at an end opposite the annular lip; a plurality of sensors for measuring at least one parameter relateed to insertion of the instrument in the insertion channel and generating the insertion data, at least one among the plurality of sensors being positioned along one of the at least two telescopic hollow channel segments in such a manner that the one among the plurality of sensors collapses with the one of the at least two telescopic hollow channel segments, the at least one among the plurality of sensors being configured for continuously measuring the parameter related to the insertion of the instrument and generating insertion data only when a predetermined threshold measurement value is reached; and a communication module for transmitting the insertion data to an insertion data collection unit; the insertion data collection unit for collecting the insertion data transmitted by the communication module of the measurement ring; a simulation engine comprising: memory for storing instructions for executing a simulation of the medical procedure; a database for storing simulation data used during the execution of the simulation of the medical procedure; and at least one processor for executing the instructions for executing the simulation of the medical procedure, the execution of the instructions comprising processing by the at least one processor the simulation data stored in the database in combination with the insertion data collected by the insertion data collecting unit to control the execution of the simulation of the medical procedure; wherein the communication module of the measurement ring is adapted for receiving a command signal for actuating one among the plurality of sensors for measuring a particular parameter of insertion of the at least one instrument in the insertion channel, the command signal being generated by the at least one processor of the simulation engine while executing the instructions for executing the simulation of the medical procedure, the command signal comprising an identification of the one among the plurality of sensors to be actuated for performing the measurement of the particular parameter; and a display for displaying an image of an anatomical area corresponding with a position of the instrument inserted in the insertion channel, the image of the anatomical area being generated by the simulation engine based on the insertion data collected by the insertion data collection unit.

2. The simulation system of claim 1, wherein the hollow channel and the annular lip are made as one piece of medical grade material.

3. The simulation system of claim 1, wherein the plurality of sensors measures at least one of the following parameters: insertion of the instrument in the insertion channel, movement of the instrument in the insertion channel, pressure applied by the instrument against the insertion channel and location point of pressure applied by the instrument against the insertion channel.

4. The simulation system of claim 1, wherein one among the plurality of sensors further detects pressure applied by the instrument along an internal periphery of the annular lip.

5. The simulation system of claim 1, wherein one among the plurality of sensors is located along a periphery of the hollow channel.

6. The simulation system of claim 1, wherein one of the at least one sensor is located along a length of the hollow channel.

7. The simulation system of claim 1, wherein the annular lip is large enough to cover the lips and teeth of a mannequin when the measurement ring is inserted in the mouth of the mannequin.

8. The simulation system of claim 1, wherein one among the plurality of sensors is embedded within a material of the hollow channel.

9. The simulation system of claim 1, wherein one among the plurality of sensors is embedded within a material of the annular lip.

10. The simulation system of claim 1, wherein the communication module communicates wirelessly with the insertion data collection unit using a standard communication protocol.

11. The simulation system of claim 1, wherein the communication module comprises a processor, a memory and communication means, the communication means comprising an antenna and a transceiver.

12. The simulation system of claim 1, further comprising a display for displaying the insertion data collected by the insertion data collection unit.

13. The simulation system of claim 1, wherein the database further stores at least one of the following: the insertion data collected by the insertion data collection unit, and information generated by the at least one processor while executing the instructions for executing the simulation of the medical procedure.

* * * * *